US012529343B2

(12) United States Patent
Ross et al.

(10) Patent No.: US 12,529,343 B2
(45) Date of Patent: Jan. 20, 2026

(54) SYSTEM, METHOD, AND DEVICE FOR CONTROLLING A THROTTLE RESPONSE OF A VEHICLE

(71) Applicant: Toyota Motor Engineering & Manufacturing North America, Inc., Plano, TX (US)

(72) Inventors: Monica M. Ross, Ann Arbor, MI (US); Garrett P. Munson, Milford, MI (US); Adam C. McJunkin, Ann Arbor, MI (US); Shigeki Amano, Ann Arbor, MI (US); Shogo Tanaka, Toki (JP); Takahiro Anami, Toyota (JP); Yoshihisa Nakamura, Okazaki (JP)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 0 days.

(21) Appl. No.: 18/515,918

(22) Filed: Nov. 21, 2023

(65) Prior Publication Data

US 2025/0163857 A1 May 22, 2025

(51) Int. Cl.
 *F02D 9/02* (2006.01)
 *F02D 41/00* (2006.01)

(52) U.S. Cl.
CPC ........... *F02D 9/02* (2013.01); *F02D 41/0002* (2013.01); *F02D 2009/0225* (2013.01); *F02D 2009/0235* (2013.01); *F02D 2200/0414* (2013.01)

(58) Field of Classification Search
CPC .............. F02D 9/02; F02D 41/0002; F02D 2009/0225; F02D 2009/0235; F02D 2200/0414
See application file for complete search history.

(56) References Cited

U.S. PATENT DOCUMENTS

| 5,083,434 A | 1/1992 | Dahlgren et al. |
| 5,605,044 A | 2/1997 | Zimmer et al. |

(Continued)

FOREIGN PATENT DOCUMENTS

| CA | 1315162 C | 3/1993 |
| DE | 10235013 B4 | 7/2004 |

(Continued)

OTHER PUBLICATIONS

Machine Translation of JP 2015021434 A PDF File Name: "JP2015021434A_Machine_Translation.pdf" (Year: 2015).*

(Continued)

*Primary Examiner* — Lindsay M Low
*Assistant Examiner* — Ruben Picon-Feliciano
(74) *Attorney, Agent, or Firm* — Snell & Wilmer LLP

(57) ABSTRACT

Methods, systems, and devices for a throttle response control system that controls the rate at which a throttle opens. The throttle response control system includes one or more sensors and an electronic control unit connected to the sensors, the one or more sensors being configured to detect an air temperature in an intake hose, an engine speed, and an air pressure in the intake manifold. The electronic control unit is configured receive data from the one or more sensors and to activate a rate limit logic when the air temperature in the intake hose and the engine speed are greater than a temperature threshold and an engine speed threshold, respectively, and the air pressure in the intake manifold is less than a pressure threshold, causing the throttle to slow the rate at which the throttle opens based on the air temperature in the intake hose.

20 Claims, 12 Drawing Sheets

(56) References Cited

U.S. PATENT DOCUMENTS

| | | |
|---|---|---|
| 6,886,335 B2 | 5/2005 | Tabata et al. |
| 7,775,043 B2 | 8/2010 | Funke et al. |
| 8,596,064 B2 | 12/2013 | Fulton et al. |
| 8,967,118 B2 | 3/2015 | Whitney et al. |
| 9,890,879 B2 | 2/2018 | Schelhaas et al. |
| 11,492,958 B2 | 11/2022 | Herceg et al. |

FOREIGN PATENT DOCUMENTS

| | | | |
|---|---|---|---|
| JP | 2015021434 A | * | 2/2015 |
| JP | 2015190329 A | * | 11/2015 |

OTHER PUBLICATIONS

Machine Translation of JP 2015190329 A PDF File Name: "JP2015190329A_Machine_Translation.pdf" (Year: 2015).*

* cited by examiner

SYSTEM, METHOD, AND DEVICE FOR CONTROLLING A THROTTLE RESPONSE OF A VEHICLE

BACKGROUND

Field

This disclosure relates to a system, method, and/or device for controlling a throttle response of a vehicle.

Description of the Related Art

In vehicles, early examples of throttle control were purely mechanical assemblies. For example, a mechanical linkage such as a cable would link an accelerator pedal to a throttle body of a vehicle so that a change in position of the accelerator pedal would have a direct correlation to a change in position of the throttle body. The majority of modern vehicles have moved to electronic throttle control (ETC) systems, where the accelerator pedal provides input data, such as a pedal angle, to an electronic control unit (ECU) of the vehicle. The ECU may then control a throttle angle of the throttle body based on the pedal angle by outputting a target throttle angle to the throttle body. The pedal angle generally corresponds to the target throttle angle output of the ECU. The ECU may, however, apply rate limits to the target throttle angle as necessary to meet performance and drivability metrics and specify specific target throttle angles for various vehicle operating conditions (e.g., vehicle is at idle, engine is starting, vehicle is shifting gears, pedal tip-in, etc.). However, under certain conditions, the target throttle angle output from the ECU of current ETC systems may result in a driver of the vehicle experiencing slower acceleration and throttle response when depressing the accelerator pedal due to a rapid loss of pressure and air throughput of an intake hose of the vehicle when the throttle body opens to the target throttle angle.

As such, there is a need for systems, methods, and devices to allow the driver to have a better and more consistent driving experience by improving throttle response, acceleration, torque output, and vehicle performance and efficiency.

SUMMARY

In general, one aspect of the subject matter described in this disclosure may be embodied in a vehicle having an engine. The vehicle includes an intake manifold that is coupled to the engine. The vehicle further includes a throttle valve that is coupled to the intake manifold and configured to regulate air intake into the intake manifold and the engine by opening and closing. The engine further includes an intake hose that is coupled to the throttle valve and configured to carry air therethrough. The vehicle further includes a first temperature sensor that is configured to detect a temperature of the air in the intake hose. The vehicle further includes a first pressure sensor that is configured to detect a pressure of the air in the intake manifold. The vehicle further includes an engine speed sensor that is configured to detect an engine speed of the vehicle. The vehicle further includes a memory configured to store a temperature threshold, a pressure threshold, and an engine speed threshold. The vehicle further includes a throttle controller that is coupled to the throttle valve. The throttle controller is configured to receive data from the temperature sensor, the air pressure sensor, and the engine speed sensor. The throttle controller is further configured to active a rate limit logic when the intake hose air temperature and the engine speed are greater than the threshold temperature and the threshold engine speed, respectively, and the intake manifold air pressure is less than the threshold pressure, causing the throttle valve to slow the rate at which the throttle valve opens based off the intake hose air temperature.

In another aspect, the subject matter may be embodied in a method for controlling a throttle response of a vehicle having a throttle. The method including storing, in a memory, a temperature threshold, a pressure threshold, and an engine speed threshold. The method further includes receiving, by an electronic control unit (ECU), an accelerator pedal input via an accelerator pedal sensor. The accelerator input corresponds to a target throttle angle. The method further includes receiving, by the ECU, a first temperature reading of the air in an intake hose via a first temperature sensor. The method further includes receiving, by the ECU, a first pressure reading of the air in an intake manifold via a first pressure sensor. The method further includes, receiving, by the ECU, an engine speed reading via an engine speed sensor. The method further includes activating, by the ECU, a rate limit logic when the temperature reading of the air in the intake hose and the engine speed reading are greater than the temperature threshold and the engine speed threshold, respectively, and the pressure reading of the air in the intake manifold is less than the pressure threshold, causing the throttle to slow the rate at which the throttle opens to the throttle target angle based off the temperature reading of the air in the intake hose.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention. In the drawings, like reference numerals designate like parts throughout the different views.

DETAILED DESCRIPTION

Figure 1:
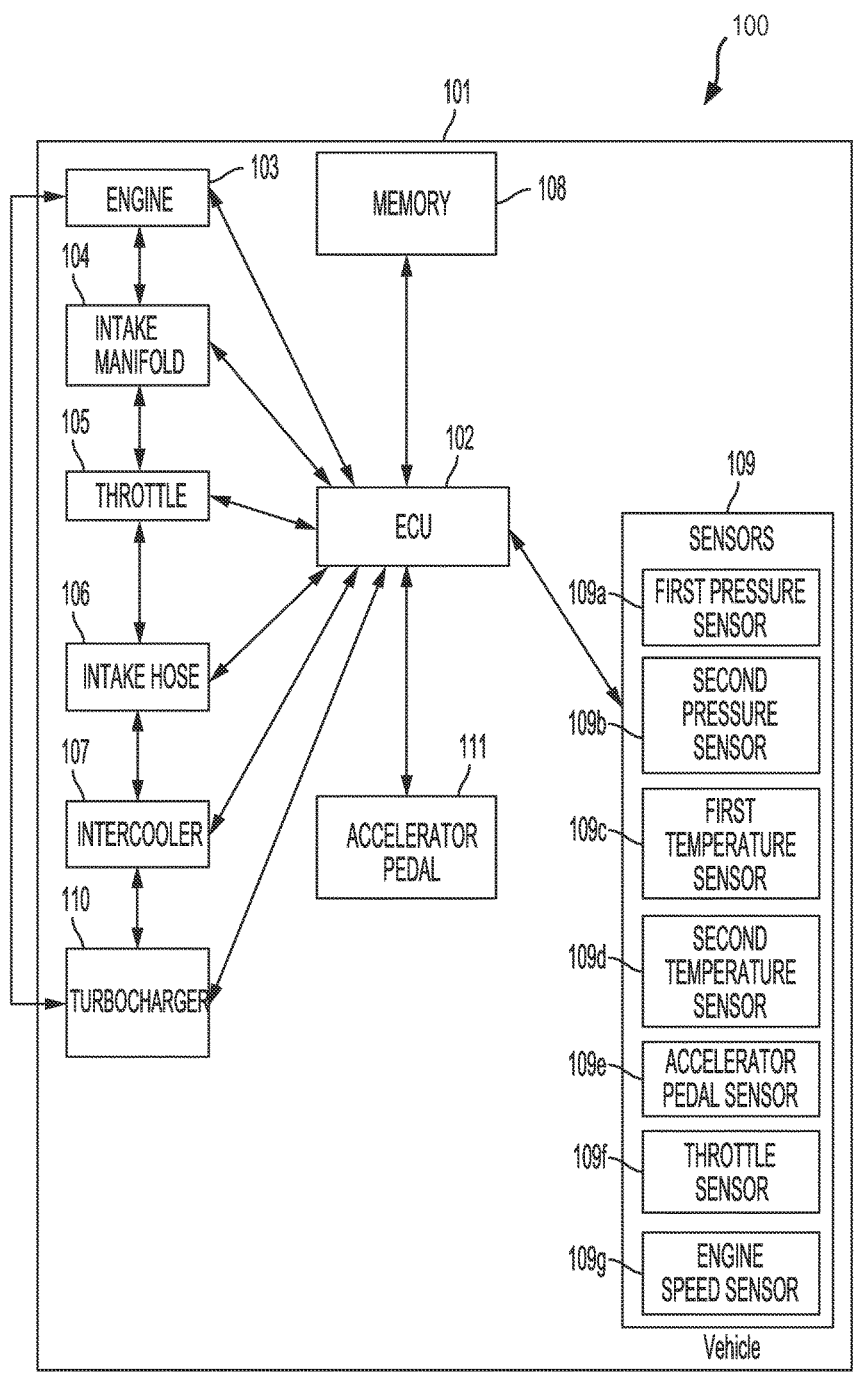
FIG. 1 is a block diagram of an example throttle response control system for a vehicle according to an aspect of the invention.

Disclosed herein are systems, devices, and methods for a throttle response control system for a vehicle. The throttle response control system controls a rate at which a throttle opens to a target throttle angle to prevent an intake hose of the vehicle from restricting a flow of air running through the intake hose during rigorous driving conditions. Particular embodiments of the subject matter described in this specification may be implemented to realize one or more of the following advantages.

The throttle response control system may include an engine control software algorithm designed to prevent the intake hose from degrading and/or restricting airflow. The throttle response control system provides more points of control within an electronic throttle control system of the vehicle than previous systems.

Moreover, the throttle response control system has the benefit of preventing a driver of the vehicle from experiencing slow acceleration, slow throttle response, hesitation, and low torque output of the vehicle during rigorous driving such as towing, aggressive offroad driving, high performance road driving, and/or driving in sport vehicle settings. The throttle response control system monitors, analyzes, and/or searches for multiple sensor inputs and/or outputs and detects conditions that have been judged to be within a range where the intake hose is at risk of restricting airflow and/or degrading by comparing the sensor outputs to threshold values stored in a memory. These conditions may include high engine speed, high air temperatures, and low intake manifold pressure. If the risk is present, the throttle response control system may control and/or slow the rate at which the throttle opens and/or the throttle output by activating a rate limit logic to prevent the intake hose from restricting airflow, thereby improving the throttle response of the vehicle. By controlling the rate at which the throttle opens, the throttle response control system has the benefit of delivering a more consistent driving experience, faster acceleration, higher torque, and faster throttle response.

Moreover, the degree to which the throttle response control system slows the rate at which the throttle opens may be based on the air temperature in the intake hose, the air temperature in the intake manifold, an engine speed of an engine, the air pressure in the intake manifold, and/or the air pressure in the intake hose. By monitoring these variables using sensors, for example, and dynamically changing the rate at which the throttle opens, the throttle response control system has the benefit of providing the driver the fastest throttle response possible before the intake hose restricts airflow. By not monitoring these variables with respect to the effects they have on the intake hose, prior systems result in torque dips, causing slow acceleration, during rigorous driving maneuvers.

Moreover, the throttle response control system may slow the rate at which the throttle opens only when necessary by activating the rate limit logic only when conditions are such that the intake hose is at risk of restricting airflow such as, for example, high engine speed, high intake manifold air temperature, high intake hose air temperature, low intake manifold air pressure, and/or low intake hose air pressure. By limiting when the rate limit logic is activated, the throttle response control system has the added benefit of not affecting other subsystems of the vehicle.

Moreover, the throttle response control system has the benefit of enabling a wider selection of material choices and designs for the intake hose. Without the throttle response control system, engineers must carefully select materials and designs for the intake hose because when the throttle opens too quickly, the intake hose may be exposed to low air pressure from an intake manifold of the vehicle and exposure to the low air pressure may cause the intake hose to restrict the flow of air running through it. Material choice and design may improve an intake hose's stiffness and resistance to deforming and thus reduce the risk of the intake hose restricting airflow, however, due to higher cost, material availability, and other design constraints (e.g., size of the intake hose), a purely material and design-based solution is inferior to the throttle response control system. The throttle response control system can be tuned and/or calibrated for a specific type of intake hose by storing specific threshold values in the memory and/or changing the degree to which the rate limit logic slows the rate at which the throttle opens. The throttle response control system allows the intake hose to be made from rubber and/or silicone without substantial reinforcement (e.g., 3-ply polyester reinforcing) instead of aluminum, steel, and/or hard plastics, which has the benefit of lower engineering costs, lower material costs, and higher availability from suppliers.

FIG. 1 is a block diagram for an example throttle response control system 100 (also can be referred to as an engine control system 100). The throttle response control system 100 or a portion thereof may be retro-fitted, coupled to, include or be included within a vehicle 101 or separate from the vehicle 101. The vehicle 101 may be a conveyance capable of transporting a person, an object, or a permanently or temporarily affixed apparatus. The vehicle 101 may be a self-propelled wheeled conveyance, such as a car, a sports utility vehicle, a truck, a bus, a van or other motor, battery or fuel cell driven vehicle. For example, the vehicle 101 may be a hybrid vehicle, a hydrogen fuel cell vehicle, a plug-in hybrid vehicle or any other type of vehicle that has a fuel cell stack, a motor, an engine, and/or a generator. Other examples of vehicles include bicycles, trains, planes, or boats, and any other form of conveyance that is capable of transportation. The vehicle 101 may be semi-autonomous or autonomous. That is, the vehicle 101 may be self-maneuvering and navigate without human input. An autonomous vehicle may have and use one or more sensors and/or a navigation unit to drive autonomously.

The throttle response control system 100 may include an engine 103. The engine 103 may be coupled to the vehicle 101. The engine 103 may be an internal combustion engine (ICE). In this regard, the engine 103 may combust an air and fuel mixture to provide power to the vehicle 101. Accordingly, the engine 103 can cause the vehicle 101 to accelerate, decelerate, or maintain a desired velocity. It should be understood that the engine 103 may include combinations of an ICE and an electric motor, such as for hybrid vehicle applications for example. The engine 103 may be naturally aspirated or may be forced induction.

The throttle response control system 100 may further include an intake manifold 104 coupled to the engine 103. The intake manifold 104 may be a manifold and/or an air intake manifold. The intake manifold 104 may receive air and carry the air therethrough to the engine 103. The intake manifold 104 may be designed to evenly distribute the air and/or a fuel and air mixture into the engine 103.

The throttle response control system 100 may further include a throttle 105. The throttle 105 may be coupled to the intake manifold 104. The throttle 105 may be a throttle body and/or an electronic throttle body. The throttle 105 may regulate air intake into the intake manifold 104 and the engine 103 by opening and closing, thereby restricting and/or unrestricting a flow of the air. The throttle 105 may include a valve and/or a butterfly valve that is configured to open and close, thereby regulating the airflow into the intake manifold 104 and the engine 103 by unrestricting and/or restricting the airflow. The throttle 105 may include one or more actuators (e.g., electric actuator motors, servomotors, etc.). The throttle 105 may be configured to receive a target throttle angle and to open to the target throttle angle. The target throttle angle corresponds to a position and/or an angle of the throttle 105 and/or the valve of the throttle 105. The throttle 105 may open at a rate of speed, meaning that the throttle 105 will open and/or move from a current position and/or angle to the target throttle angle at the rate of speed.

The throttle response control system 100 may further include an intake hose 106. The intake hose 106 may be coupled to the throttle 105. The intake hose 106 may be a boost hose, an inlet, and/or a charge pipe. The intake hose 106 may receive air and carry the air therethrough to the throttle 105. The intake hose 106 may be made from various materials including, but not limited to, various formulations and/or combinations of polyester, plastic, aluminum, rubber, and/or silicone.

Figure 2:
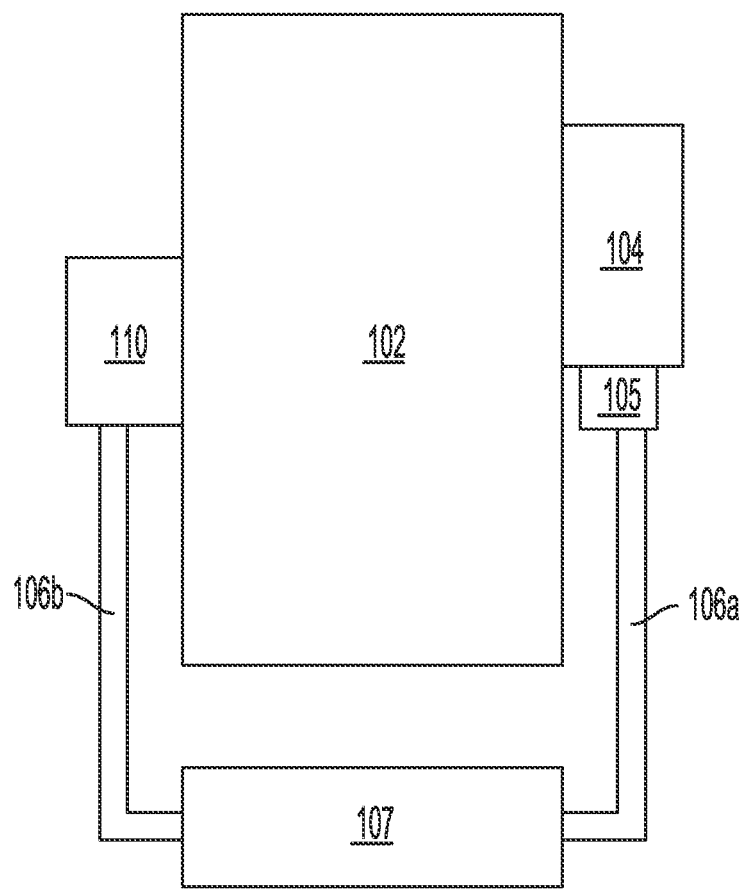
FIG. 2 illustrates part of the example throttle response control system of FIG. 1 according to an aspect of the invention.

Referring briefly to FIGS. 1 and 2, the throttle response control system 100 may further include a plurality of intake hoses, including a first intake hose 106a and a second intake hose 106b. The first intake hose 106a may be coupled to the throttle 105. The plurality of intake hoses may receive air from and/or carry air to various components of the vehicle 101 and/or the throttle response control system 100.

The throttle response control system 100 may further include an intercooler 107. The intercooler 107 may be coupled to the intake hose 106 and/or the plurality of intake hoses, including the first intake hose 106a and/or the second intake hose 106b. The intercooler 107 may receive air from the second intake hose 106b and carry the air therethrough to the first intake hose 106a. The intercooler 107 may carry air therethrough to and/or transfer the air to the intake hose 106. The throttle response control system 100 may include a plurality of intercoolers.

The throttle response control system 100 may further include a turbocharger 110 and/or a supercharger. The turbocharger 110 and/or the supercharger may be coupled to the engine 103 and/or the intake hose 106 and/or the second intake hose 106b. The turbocharger 110 and/or supercharger may receive air, compress the air, and then provide the air to the intake hose 106 and/or the plurality of intake hoses, including the first intake hose 106a and/or the second intake hose 106b. If the throttle response control system 100 includes both a turbocharger 110 and a supercharger, the air may be compressed in two stages.

The throttle response control system 100 may further include an accelerator pedal 111. The accelerator pedal 111 may be coupled to the vehicle 101. The accelerator pedal 111 may be depressed by a driver of the vehicle 101. A position and/or an angle of the accelerator pedal 111 corresponds to an amount depressed by the driver or user.

The throttle response control system 100 may further include one or more sensors 109. The one or more sensors 109 may include a first pressure sensor 109a, a second pressure sensor 109b, a first temperature sensor 109c, a second temperature sensor 109d, an accelerator pedal sensor 109e, a throttle body sensor 109f, and/or an engine speed sensor 109g.

The first pressure sensor 109a may be coupled to the intake manifold 104 and/or the throttle 105. The first pressure sensor 109a may measure, detect, and/or determine an air pressure in the intake manifold 104.

The second pressure sensor 109b may be coupled to the intake hose 106 and/or the intercooler 107. The second pressure sensor 109b may measure, detect, and/or determine an air pressure in the intake hose 106 and/or the intercooler 107.

The first temperature sensor 109c may be coupled to the intake hose 106 and/or the intercooler 107. The first temperature sensor 109c may measure, detect, and/or determine a temperature of the air in and/or entering the intake hose 106.

The second temperature sensor 109d may be coupled to the intake manifold 104 and/or the throttle 105. The second temperature sensor 109d may measure, detect, and/or determine a temperature of the air in and/or entering the intake manifold 104.

The accelerator pedal sensor 109e may be coupled to the accelerator pedal 111. The throttle response control system 100 may include one or more accelerator pedal sensors 109e. The accelerator pedal sensor 109e may measure, detect, and/or determine the position and/or the angle of the accelerator pedal 111 to determine the amount and/or the angle that the accelerator pedal 111 is depressed by the driver. The accelerator pedal sensor 109e may be and/or include a potentiometer.

The throttle sensor 109f may be coupled to the throttle 105. The throttle sensor 109f may be a throttle body sensor and/or a throttle position sensor (TPS). The throttle sensor 109f may measure, detect, and/or determine a position and/or angle of the throttle 105 and/or the valve of the throttle 105. The throttle sensor 109f may optionally and/or additionally measure, detect, and/or determine a temperature of the air in and/or entering the throttle 105.

The engine speed sensor 109g may be coupled to the engine 103. The engine speed sensor 109g may measure, detect, and/or determine an engine speed of the engine 103. For example, the engine speed sensor 109g may measure, detect, and/or determine a rotations per minute (RPM) of the engine 103.

The throttle response control system 100 may include one or more processors, such as the electronic control unit (ECU) 102. The one or more processors, such as the ECU 102, may be implemented as a single processor or as multiple processors. For example, the one or more processors may be a microprocessor, data processor, microcontroller or other controller, and may be electrically coupled to some or all the other components within the vehicle 101 and/or the throttle response control system 100. The ECU 102 may be coupled to at least one of a memory 108, the engine 103, the intake manifold 104, the throttle 105, the intake hose 106, the intercooler 107, the turbo charger 110, and/or the one or more sensors 109. The ECU 102 may include one or more processors or controllers specifically designed for controlling operations of the vehicle 101, such as a throttle response and/or a throttle position.

The throttle response control system 100 may include the memory 108. The memory 108 may be coupled to the ECU 102. The memory 108 may store instructions to execute on the ECU 102, including a rate limit logic. The memory 108 may store one or more tables of maximum throttle rates of speeds (i.e., the speed and/or rate at which the throttle opens), wherein a specific engine speed and a specific air pressure in the intake manifold 104 correspond to a maximum throttle rate of speed. The tables may be dynamically updated by the ECU 102 based on the air temperature in the intake manifold 104, the air temperature in the intake hose 106, and/or the air pressure in the intake hose 106. For example, the maximum throttle rate of speed for a given engine speed and a given air pressure in the intake manifold 104 may be slowed and/or altered by a high air temperature in the intake hose 106.

The memory 108 may include one or more of a Random Access Memory (RAM), a Read Only Memory (ROM) or other volatile or non-volatile memory. The memory 108 may be a non-transitory memory or a data storage device, such as a hard disk drive, a solid-state disk drive, a hybrid disk drive, or other appropriate data storage, and may further store machine-readable instructions, which may be loaded and executed by the ECU 102. The memory 108 may store vehicle parameters (e.g., vehicle weight, temperature tolerances, air pressure tolerances, etc.). The memory 108 may store a temperature threshold, a pressure threshold, and/or an engine speed threshold. The memory 108 may store one or more combinations of one or more temperature thresholds, one or more pressure thresholds, and/or one or more engine speed thresholds. At least one of the temperature threshold, the pressure threshold, and/or the engine speed threshold may be determined and/or calculated based on the intake hose's 106 structural integrity characteristics. For example, the structural integrity characteristics may include, but are not limited to, what combinations of temperature of the air in the intake hose 106 and air pressure (e.g., positive and/or negative air pressure relative to outside of the intake hose 106 and/or inside the intake manifold 104) of the air in the intake hose 106, the intake hose 106 can safely withstand and/or hold before restricting airflow, failing, and/or changing shape (e.g., cross sectional area of the intake hose 106 becoming smaller, the intake hose 106 changing from a circular shape to an oval shape, etc.). The structural integrity characteristics of the intake hose 106 may depend on what material the intake hose 106 is made from and/or of and what structural design is implemented (e.g., the intake hose 106 may be reinforced with ribs and/or other features). A particular intake hose 106 may be tested to determine at what combinations of throttle rates of speeds, temperatures, pressures, and/or engine speeds the intake hose 106 begins to degrade, restrict airflow, and/or affect performance of the vehicle 101 (without the rate limit logic active), and then the throttle rates of speeds, the temperatures, the pressures, and/or the engine speeds may be stored in the memory 108 as the maximum throttle rates of speeds, the temperature thresholds, the pressure thresholds, and/or the engine speed thresholds. This allows the throttle response control system 100 to be tailored to a specific vehicle 101 and/or intake hose 106.

The structural integrity characteristics of the intake hose 106 may also depend on the temperature of the intake hose 106 itself. For example, as the temperature of the intake hose 106 rises, the intake hose 106 may be more prone to changing shape and restricting the flow of air running through the intake hose 106. This restriction is especially likely when the air temperature in the intake hose 106 and/or the intake manifold 104 is high, because these two temperatures correspond to the temperature of the intake hose 106 itself. When the air temperature in the intake hose 106 is high, for example over 35 degrees Celsius, and the engine speed is high, for example over 3,000 RPM, there is an increased risk that if the intake hose 106 is suddenly exposed to a low air pressure in the intake manifold 104, for example, below 50 kilopascal, due to the throttle 105 opening to the target throttle angle at a high rate of speed, then the intake hose 106 may deform and/or restrict the flow of air to the throttle 105. This restriction of air may cause a loss of torque output since the engine 103 receives less air. The restriction may also cause a drop in the air pressure in the intake manifold 104. The driver may perceive the restriction as slow acceleration, low torque output, and slow throttle response of the vehicle 101. Generally, the throttle 105 opening at a high rate of speed is associated with a fast throttle response, meaning that the vehicle 101 responds quickly to the driver's depressing of the accelerator pedal 111 due to an immediate increase in power output from the engine 103. But as explained above, the throttle 105 opening too quickly may have the opposite result, and thus slowing the rate at which the throttle 105 opens may improve the throttle response of the vehicle 101.

Figure 3:
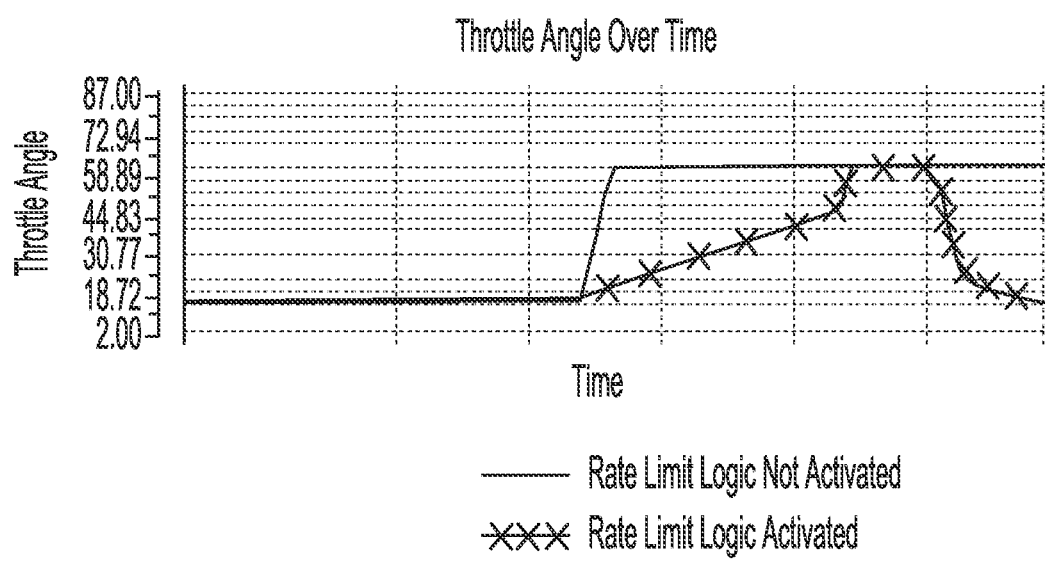
FIG. 3 is an example graph of a throttle angle of the vehicle changing over time when a rate limit logic is activated and when the rate limit logic is not activated according to an aspect of the invention.
Figure 4:
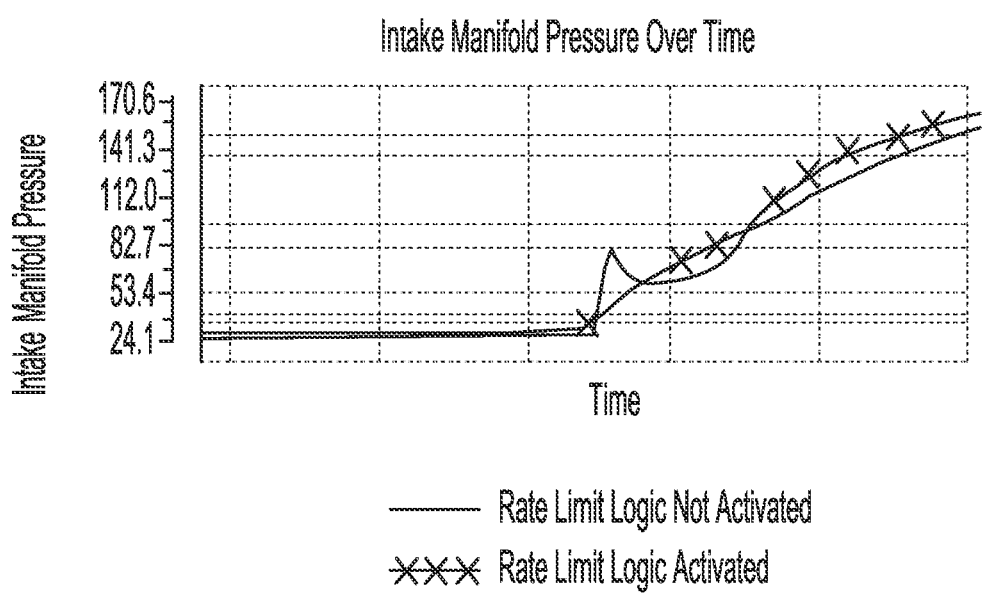
FIG. 4 is an example graph of an intake manifold air pressure of the vehicle changing over time when a rate limit logic is activated and when the rate limit logic is not activated according to an aspect of the invention.

Referring to FIGS. 3 and 4, graphs of an example throttle angle of the throttle 105 and an air pressure in the intake manifold 104 changing over time when the rate limit logic is activated by the ECU 102, compared to the rate limit logic not being activated are shown. When a driver of the vehicle 101 depresses the accelerator pedal 111, the accelerator pedal sensor 109e measures, detects, and/or determines the accelerator pedal's 111 position. The accelerator pedal sensor 109e may then send pedal position data and/or a pedal position reading to the ECU 102. The ECU 102 then determines and/or receives the accelerator pedal's 111 position. Generally, the accelerator pedal's 111 position corresponds to an angle of the throttle 105. For example, if the driver depresses the accelerator pedal 111 a maximum amount, the corresponding angle of the throttle 105 may be a maximum angle of the throttle 105, also known as a wide open throttle (WOT).

When the ECU 102 receives the accelerator pedal's 111 position, the ECU 102 may determine a target throttle angle based on the accelerator pedal's 111 position and numerous other factors including, but not limited to, speed of the vehicle 101, engine speed of the engine 103, oxygen content of the air, gradient of a surface the vehicle 101 is driving on, whether the vehicle is towing a load, etc. The ECU 102 may also receive the throttle's 105 current throttle angle from the throttle body sensor 109f. The ECU 102 may output the target throttle angle, for example, roughly 60 degrees as shown in FIG. 3, to the throttle 105 and/or may control the throttle 105 such that the throttle 105 opens and/or moves from the current throttle angle to the target throttle angle.

When opening to the target throttle angle, the throttle 105 opens and/or moves at the rate of speed. As previously stated, when the rate of speed is too fast, the pressure in the intake hose 106 may rapidly drop due to the intake hose 106 being exposed to the low air pressure in the intake manifold 104 in a short amount of time. This rapid drop in air pressure may cause the intake hose 106 to restrict the flow of air into the throttle 105 and the intake manifold 104, leading to a drop of pressure in the intake manifold 104 and thus a loss of power. For example, when the rate limit logic is not activated and the throttle angle changes quickly from about 18.72 degrees to about 60 degrees (as shown in FIG. 3), the air pressure in the intake manifold 104 briefly spikes to about 82.7 kilopascals but then quickly drops to form a trough (as shown in FIG. 4). This trough is the result of the intake hose 106 deforming and/or restricting the flow of air into the throttle 105 and the intake manifold 104.

To prevent the throttle 105 from opening too quickly and the intake hose 106 deforming and/or restricting airflow, the ECU 102 may execute the rate limit logic after receiving the accelerator pedal's 111 position. The rate limit logic may be a throttle ramp limit logic, a throttle limit logic, and/or a ramp limit logic. As shown in FIG. 3, the angle of the throttle 105 changes more slowly over time compared to when the rate limit logic is not activated. When the rate limit logic is activated, the ECU 102 may determine the maximum throttle rate of speed (i.e., the rate and/or speed at which the throttle opens), also known as a maximum throttle ramp rate, that will not result in the intake hose 106 restricting airflow, based on one or more of the air pressure in the intake manifold 104, the air pressure in the intake hose 106, the air temperature in the intake manifold 104, the air temperature in the intake hose 106, and/or the engine speed of the engine 103.

The ECU 102 may determine the maximum throttle rate of speed by selecting it from one of the one or more tables stored in the memory 108. The ECU 102 may select this value as the maximum throttle rate of speed, and/or may update the value based on the air temperature in the intake manifold 104 and/or the air temperature in the intake hose 106, and/or the greater of the air temperature in the intake manifold 104 and the air temperature in the intake hose 106, and then select the updated value as the maximum throttle rate of speed. The greater of these two temperatures represents a worst-case scenario for the temperature of the intake hose 106, meaning that the intake hose 106 is not likely to be hotter than the greater of the air temperature in the intake manifold 104 and the air temperature in the intake hose 106.

After determining the maximum throttle rate of speed, the ECU 102 may output the maximum throttle rate of speed along with the target throttle angle to the throttle 105 and/or control the throttle 105 such that the throttle 105 opens to the target throttle angle at the maximum throttle rate of speed.

Figure 5:
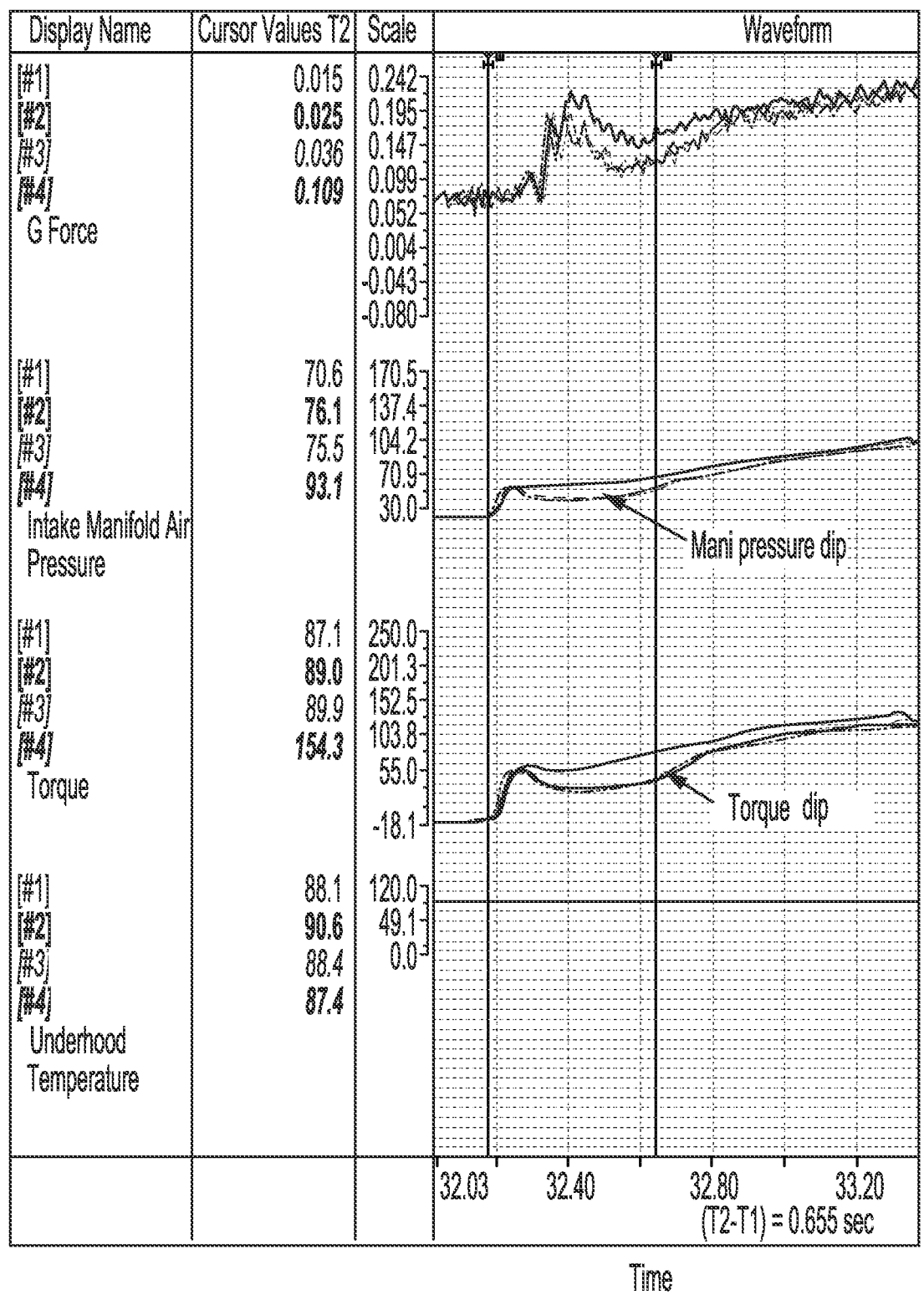
FIG. 5 is an example graph of a g-force, an intake manifold air pressure, a torque output, and an underhood temperature of the vehicle changing over time without a rate limit logic activated according to an aspect of the invention.

FIG. 5 is a graph illustrating four examples of how g-force experienced by a driver of the vehicle 101, the air pressure in the intake manifold 104, the torque output of the engine 103, and the underhood temperature of the vehicle 101 change over time when the intake hose 106 restricts airflow to varying degrees, as explained above. The g-force helps to illustrate the acceleration change of the vehicle 101. The intake manifold 104 (mani) pressure dip corresponds to a dip in the torque output of the engine 103 as shown in FIG. 5.

Figure 6:
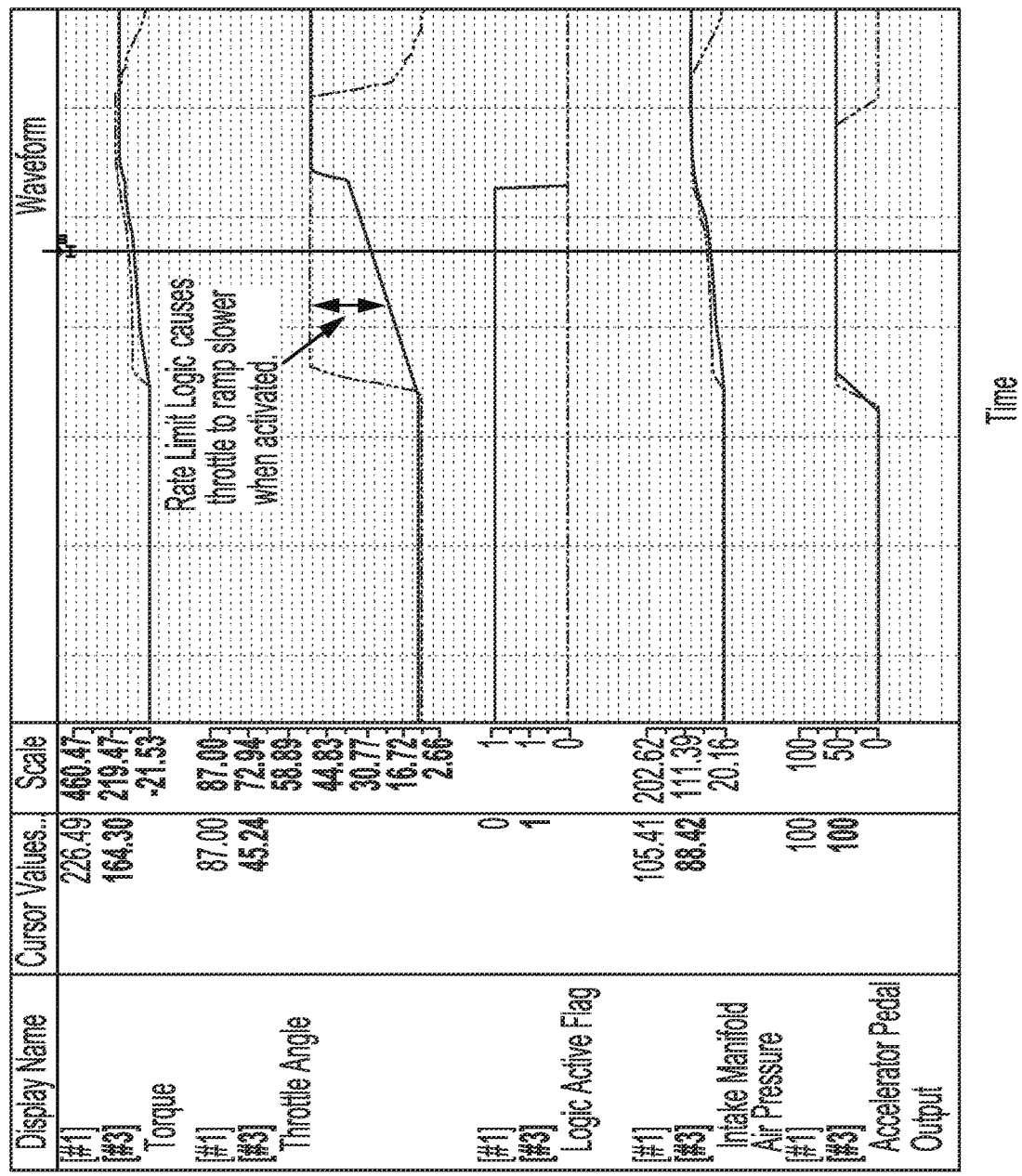
FIG. 6 is an example graph of a torque output, a throttle angle, a logic active flag, an intake manifold air pressure, and an accelerator pedal output of the vehicle changing over time when a rate limit logic is activated and when the rate limit logic is not activated according to an aspect of the invention.

FIG. 6 is a graph illustrating the torque output of the engine 103, the throttle angle, whether the rate limit logic is active, the intake manifold 104 air pressure (i.e., air pressure in the intake manifold 104), and the accelerator pedal 111 output (i.e., the accelerator pedal's 111 position) over time with the ECU 102 activating the rate limit logic, and when the ECU 102 does not active the rate limit logic. As shown, the rate limit logic causes the throttle angle to follow a smoothed-out ramp, with a smaller slope than when the rate limit logic is not activated. However, FIG. 6 is not meant to illustrate the difference in these variables due to the intake hose 106 restricting and not restricting air flow, instead, FIG. 6 is an illustration of how the rate limit logic of the throttle response control system 100 may affect and/or control the torque output of the engine 103, the throttle angle, and the air pressure in the intake manifold 104 after the ECU 102 receives the accelerator pedal 111 output.

Figure 7:
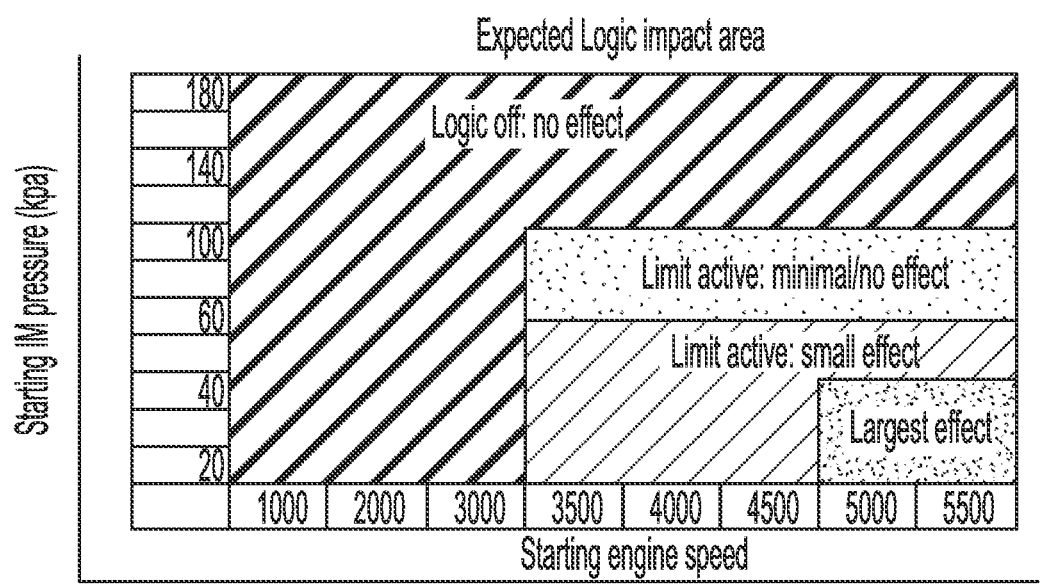
FIG. 7 is an example graph showing the degree of impact a rate limit logic has on a throttle rate of speed of the vehicle according to an aspect of the invention.

FIG. 7 is an illustration of how the impact of the rate limit logic on the throttle rate of speed may vary based on the starting intake manifold 104 pressure (i.e., the air pressure in the intake manifold 104 the moment before the throttle 105 moves to the target throttle angle) and the starting engine speed (i.e., the engine speed of the engine 103 the moment before the throttle 105 moves to the target throttle angle). The rate limit logic may be activated whenever the ECU 102 receives accelerator pedal position data, or as shown in FIG. 7, the rate limit logic may activate only under certain conditions. The rate limit logic may have a greater degree of effect on the throttle rate of speed when the accelerator pedal tip-in is from 0% pedal depression to over 50% pedal depression.

As previously stated, the memory 108 may store the temperature threshold, the pressure threshold, and/or the engine speed threshold, and the memory 108 may store the one or more combinations of the one or more temperature thresholds, the one or more pressure thresholds, and/or the one or more engine speed thresholds. When the ECU 102 receives the accelerator pedal's 111 position, the ECU 102 may determine whether to activate the rate limit logic based on the air temperature in the intake hose 106, the air temperature in the intake manifold 104, the air pressure in the intake hose 106, the air pressure in the intake manifold 104, and/or the engine speed of the engine 103. For example, the ECU 102 may activate the rate limit logic only when one or more of the following is true: the engine speed is greater than the engine speed threshold (e.g., greater than 3200 RPM, 3400 RPM, etc.), the air pressure in the intake manifold 104 is less than the pressure threshold (e.g., less than 100 kilopascal), the air pressure in the intake hose 106 is less than the pressure threshold (e.g., less than 120 kilopascal), the air temperature in the intake hose 106 is greater than the temperature threshold (e.g., greater than 30 degrees Celsius), the air temperature in the intake manifold 104 is greater than the temperature threshold (e.g., greater than 30 degrees Celsius), and/or the greater of the air temperature in the intake hose 106 and the air temperature in the intake manifold 104 is greater than the temperature threshold (e.g., greater than 30 degrees Celsius).

Moreover, after activating the rate limit logic, the ECU 102 may deactivate the rate limit logic when certain conditions are and/or become true. Returning briefly to FIG. 6, the graph illustrates how the rate limit logic causes the throttle to ramp slower (i.e., causes the throttle to open slower) when activated, however, when the rate limit logic deactivates and/or is deactivated, the rate of speed of the throttle 105 immediately returns to a rate of speed not affected by the rate limit logic (i.e., a normal operating conditions rate of speed and/or other rate of speed determined and/or selected by the ECU 102). The ECU 102 may deactivate the rate limit logic, returning the throttle rate of speed to its non-slowed state, when the air temperature in the intake hose 106, the air temperature in the intake manifold 104, and/or the greater of the two temperatures are less than the temperature threshold and/or a deactivation temperature threshold. The deactivation temperature threshold may be a temperature value lower than the temperature threshold. The rate limit logic may also be deactivated when the air pressure in the intake hose 106 and/or the difference between the air pressure in the intake hose 106 and the air pressure in the intake manifold 104 are greater than the pressure threshold and/or a deactivation pressure threshold. By monitoring various conditions and deactivating the rate limit logic, it is ensured that the throttle response control system 100 does not interfere with other subsystems of the vehicle 101, and does not decrease the throttle rate of speed when it is not necessary.

Figure 8:
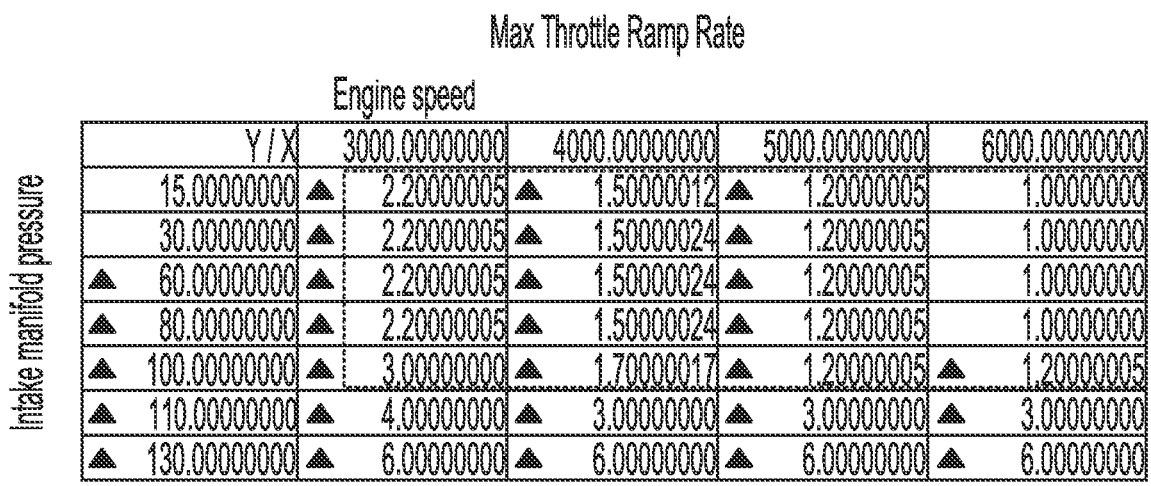
FIG. 8 is an example table of maximum throttle ramp rates stored in a memory (i.e., maximum throttle rate of speeds) with respect to an intake manifold pressure and an engine speed of the vehicle according to an aspect of the invention.

Returning to FIG. 7 and additionally FIG. 8, not only may the rate limit logic only activate under certain conditions, but the degree to which the throttle rate of speed is slowed may be based on the data and/or readings received by the ECU 102 from the one or more sensors 109. As previously stated, the ECU 102 may select the maximum throttle rate of speed (i.e., maximum throttle ramp rate) from the one or more tables (as shown in FIG. 8), determine the maximum throttle rate of speed, and/or alter the values within the tables based on data received from the one or more sensors 109. In FIG. 8, maximum throttle rates of speeds (i.e., maximum throttle ramp rates) within the dotted box represent values altered by the ECU 102 due to the rate limit logic being activated. For example, the throttle rate of speed may be slowed by a greater amount the higher the starting engine speed, the lower the starting air pressure in the intake manifold 104, and the greater the air temperatures. FIG. 8 illustrates how the maximum throttle rate of speed (i.e., maximum throttle ramp rate) is generally higher at lower engine speeds and intake manifold pressures. The maximum throttle rates of speeds in FIG. 8 may represent the degrees of throttle angle change per a calculation cycle (e.g., per 8 milliseconds).

Figure 9:
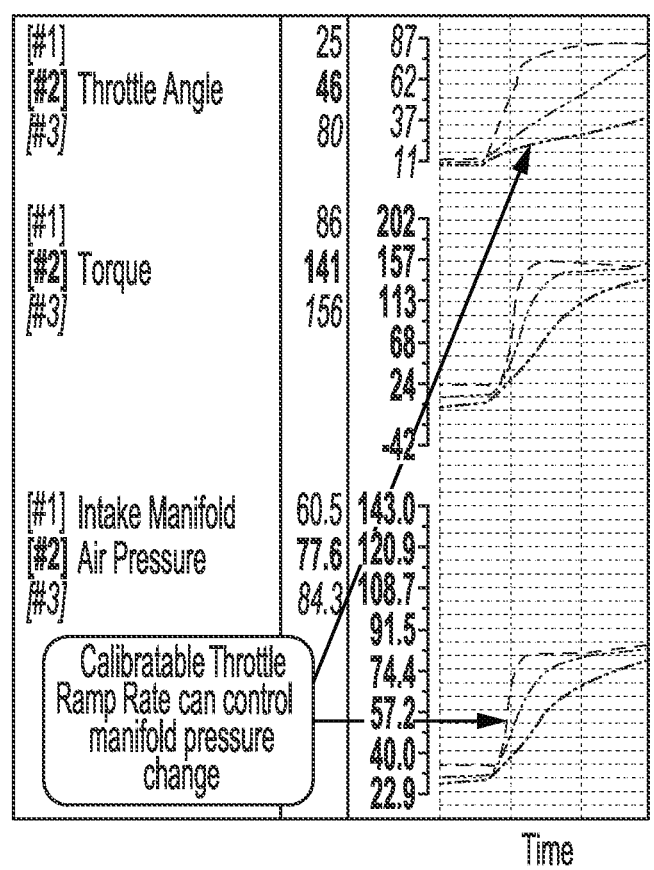
FIG. 9 is an example graph of three different calibrations of a rate limit logic and the resulting throttle angle, torque output, and intake manifold air pressure of the vehicle changing over time according to an aspect of the invention.

FIG. 9 illustrates how the throttle response control system 100 may be tuned by showing three different maximum throttle rates of speeds and the corresponding effects on torque output by the engine 103, the throttle angle, and the air pressure in the intake manifold 104, over time. For example, the maximum throttle rate of speed (i.e., maximum throttle ramp rate) can be calibrated to control the rate of change of the air pressure in the intake manifold 104 by setting and/or altering the various thresholds stored in the memory 108, the values in the one or more tables, and/or the algorithm used by the ECU 102 to determine the maximum throttle rate of speed. The calibration may be based on the material and/or design of the intake hose 106 and testing results of the intake hose 106 as previously discussed.

Figure 10:
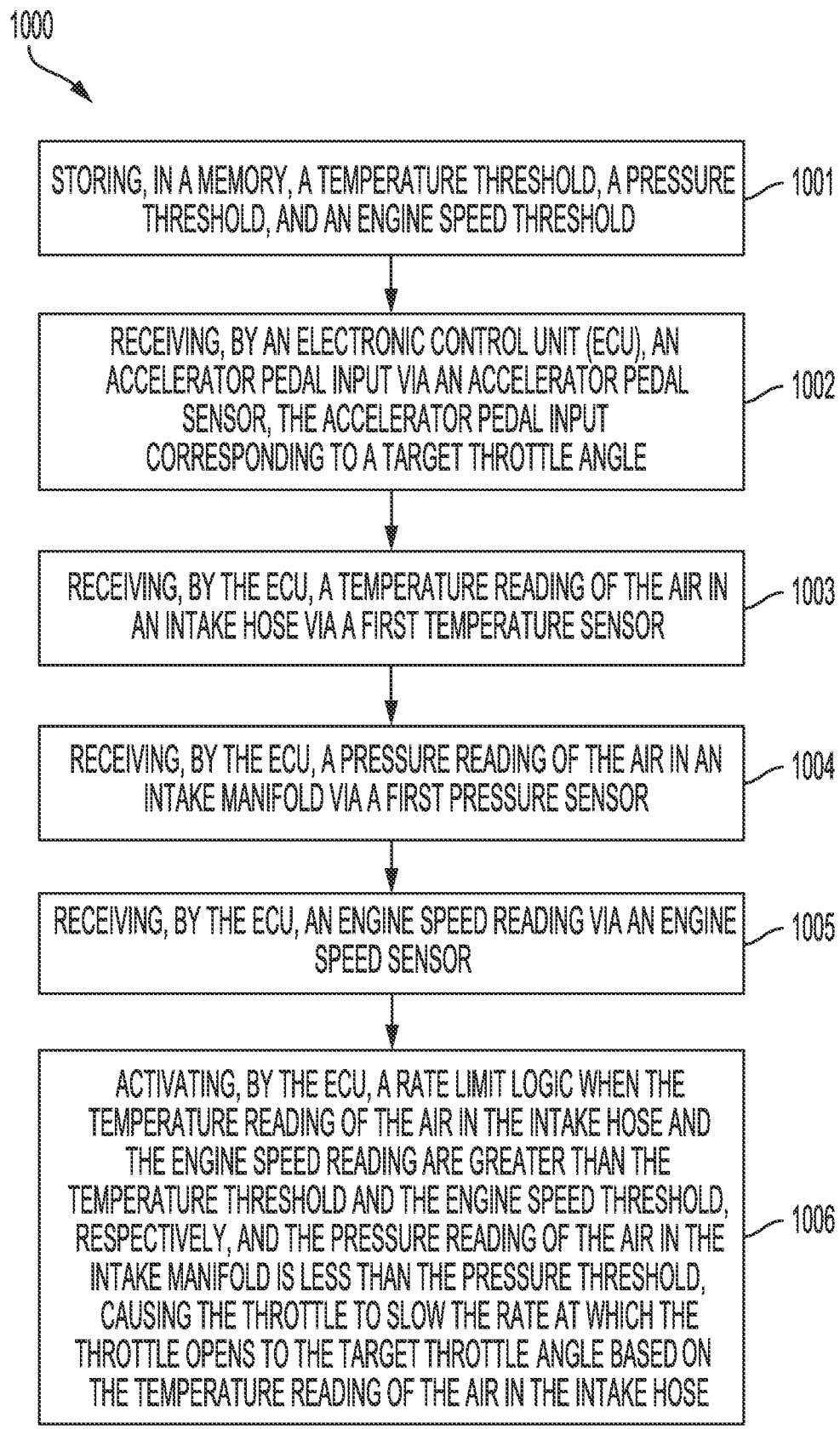
FIG. 10 is a flow diagram of an example process for controlling the throttle response control system of FIG. 1 for controlling a throttle rate of speed of a throttle of the vehicle according to an aspect of the invention.

FIG. 10 is a flow diagram of an example process 1000 for controlling and/or slowing the rate at which the throttle opens. One or more computers or one or more data processing apparatuses, for example, the ECU 102 of the throttle response control system 100 of FIG. 1, appropriately programmed, may implement the process 1000. For ease of description, the process 1000 is described below with reference to FIG. 1. The process 1000 of the present disclosure, however, is not limited to use of the exemplary throttle response control system 100 of FIG. 1.

The throttle response control system 100 may store a temperature threshold, a pressure threshold, and an engine speed threshold (1001). The temperature threshold, the pressure threshold, and the engine speed threshold may be stored in the memory 108. The temperature threshold is a predetermined temperature value of an air temperature in the intake hose 106, an air temperature in the intake manifold 104, and/or a temperature of the intake hose 106 that may cause the intake hose 106 to restrict airflow. The pressure threshold is a predetermined pressure value of an air pressure in the intake hose 106 and/or an air pressure in the intake manifold 104 that may cause the intake hose 106 to restrict airflow. The engine speed threshold is a predetermined engine speed value of the engine 103 that may cause the intake hose 106 to restrict airflow. The memory 108 may store an individual temperature threshold, pressure threshold, and/or engine speed threshold that may cause the intake hose 106 to restrict airflow, and/or may store one or more combinations of temperature thresholds, pressure thresholds, and/or engine speed thresholds that may cause the intake hose 106 to restrict airflow. The temperature threshold, the pressure threshold, and/or the engine speed threshold may be determined based on the structural integrity characteristics of the intake hose 106.

The throttle response control system 100 may receive, by the ECU 102, an accelerator pedal input via the accelerator pedal sensor 109e, with the accelerator pedal input corresponding to a target throttle angle (1002). The accelerator pedal input may result from a driver depressing the accelerator pedal 111. The ECU 102 may receive the accelerator pedal input as a position and/or an angle of the accelerator pedal 111.

The throttle response control system 100 may further receive, by the ECU 102, a temperature reading of the air in the intake hose 106 via the first temperature sensor 109c (1003). The ECU 102 may further receive a temperature reading of the air in the intake manifold 104 via the second temperature sensor 109d. The ECU 102 may continuously receive and/or monitor the temperature of the air in the intake hose 106 and/or the temperature of the air in the intake manifold 104.

The throttle response control system 100 may further receive, by the ECU 102, a pressure reading of the air in the intake manifold 104 via the first pressure sensor 109a (1004). The ECU 102 may further receive a pressure reading of the air in the intake hose 106 via the second pressure sensor 109b. The ECU 102 may continuously receive and/or monitor the pressure of the air in the intake manifold 104 and/or the pressure of the air in the intake hose 106.

The throttle response control system 100 may further receive, by the ECU 102, an engine speed reading of the engine 103 via the engine speed sensor 109g (1005). The ECU 102 may continuously receive and/or monitor the engine speed of the engine 103.

The throttle response control system 100 may activate, by the ECU 102, a rate limit logic when the temperature reading of the air in the intake hose 106 and the engine speed reading are greater than the temperature threshold and the engine speed threshold, respectively, and the pressure reading of the air in the intake manifold 104 is less than the pressure threshold, causing the throttle 105 to slow the rate at which the throttle opens to the target throttle angle based on the temperature reading of the air in the intake hose 106 (1006).

The ECU 102 may activate the rate limit logic when the temperature reading of the air in the intake hose 106 is greater than the temperature threshold. The ECU 102 may activate the rate limit logic when the greater of the temperature reading of the air in the intake hose 106 and the temperature reading of the air in the intake manifold 104 is greater than the temperature threshold, the engine speed is greater than the engine speed threshold, and/or the pressure reading of the air in the intake manifold 106 is less than the pressure threshold.

Figure 11:
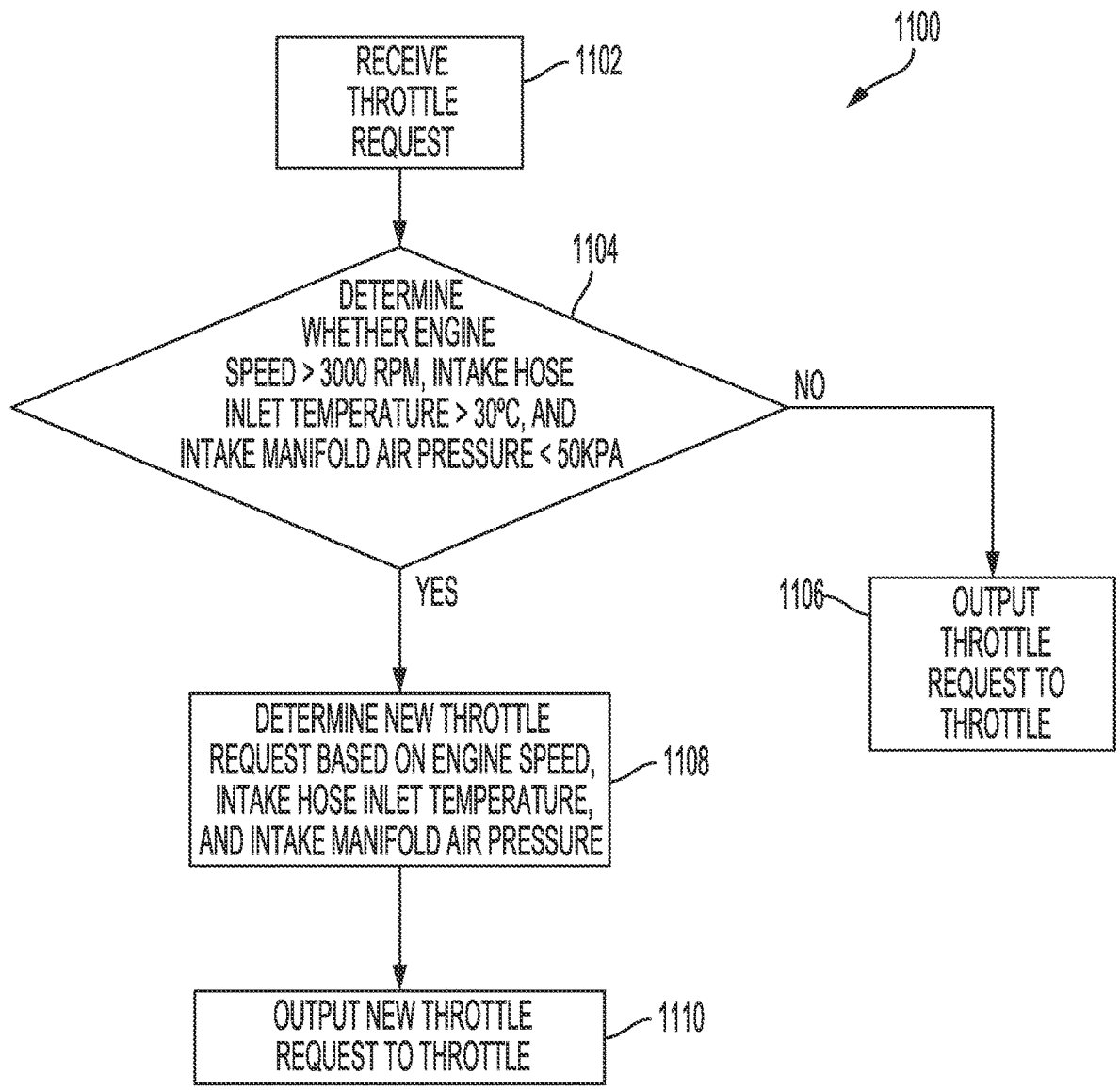
FIG. 11 is a flow diagram of an example process for controlling the throttle response control system of FIG. 1 for controlling a throttle rate of speed of a throttle of the vehicle according to an aspect of the invention.

FIG. 11 is a flow diagram of an example process 1100 for controlling and/or slowing the rate at which the throttle 105 opens. One or more computers or one or more data processing apparatuses, for example, the ECU 102 of the throttle response control system 100 of FIG. 1, appropriately programmed, may implement the process 1100. For ease of description, the process 1100 is described below with reference to FIG. 1. The process 1100 of the present disclosure, however, is not limited to use of the exemplary throttle response control system 100 of FIG. 1.

The throttle response control system may receive a throttle request (1102). A driver of the vehicle 101 may depress the accelerator pedal 111. The accelerator pedal sensor 109e may detect, measure, and/or determine an amount of depression of the accelerator pedal 111 and output a position and/or an angle of the accelerator pedal 111 to the ECU 102. The ECU 102 may receive and/or interpret the position and/or the angle of the accelerator pedal as the throttle request. The throttle request may correspond to a target throttle angle and to a throttle rate of speed of the throttle 105.

The throttle response control system 100 may determine whether an engine speed of the engine 103 is greater than 3,000 RPM (or any other engine speed threshold), an intake hose inlet temperature is greater than 30 degrees Celsius (or any other temperature threshold), and an intake manifold air pressure is less than 50 kilopascals (or any other pressure threshold) (1104). If the answer is no, the throttle response control system 100 may output the throttle request to the throttle 105 such that the throttle 105 may open to the target throttle angle at the throttle rate of speed (1106). The intake hose inlet temperature may be the air temperature in the intake hose 106, the air temperature in the intake manifold 104, and/or the greater of the air temperatures in the intake hose 106 and the intake manifold 104. If the answer is yes, the throttle response control system 100 may proceed to block 1108.

The throttle response control system 100 may further determine a new throttle request based on the engine speed, the intake hose inlet temperature, and the intake manifold air pressure (1108). In determining a new throttle request, the ECU 102 may activate a rate limit logic causing the ECU 102 to select a maximum throttle rate of speed from a table stored in the memory 108, and/or causing the ECU 102 to determine a maximum throttle rate of speed based on the engine speed, the intake hose inlet temperature, and/or the intake manifold air pressure. The new throttle request corresponds and/or includes the target throttle angle and the maximum throttle rate of speed.

The throttle response control system 100 may output the new throttle request to the throttle 105 (1110). The ECU 102 may output the new throttle request to the throttle 105 such that the throttle 105 opens to the target throttle angle at the maximum throttle rate of speed.

Figure 12:
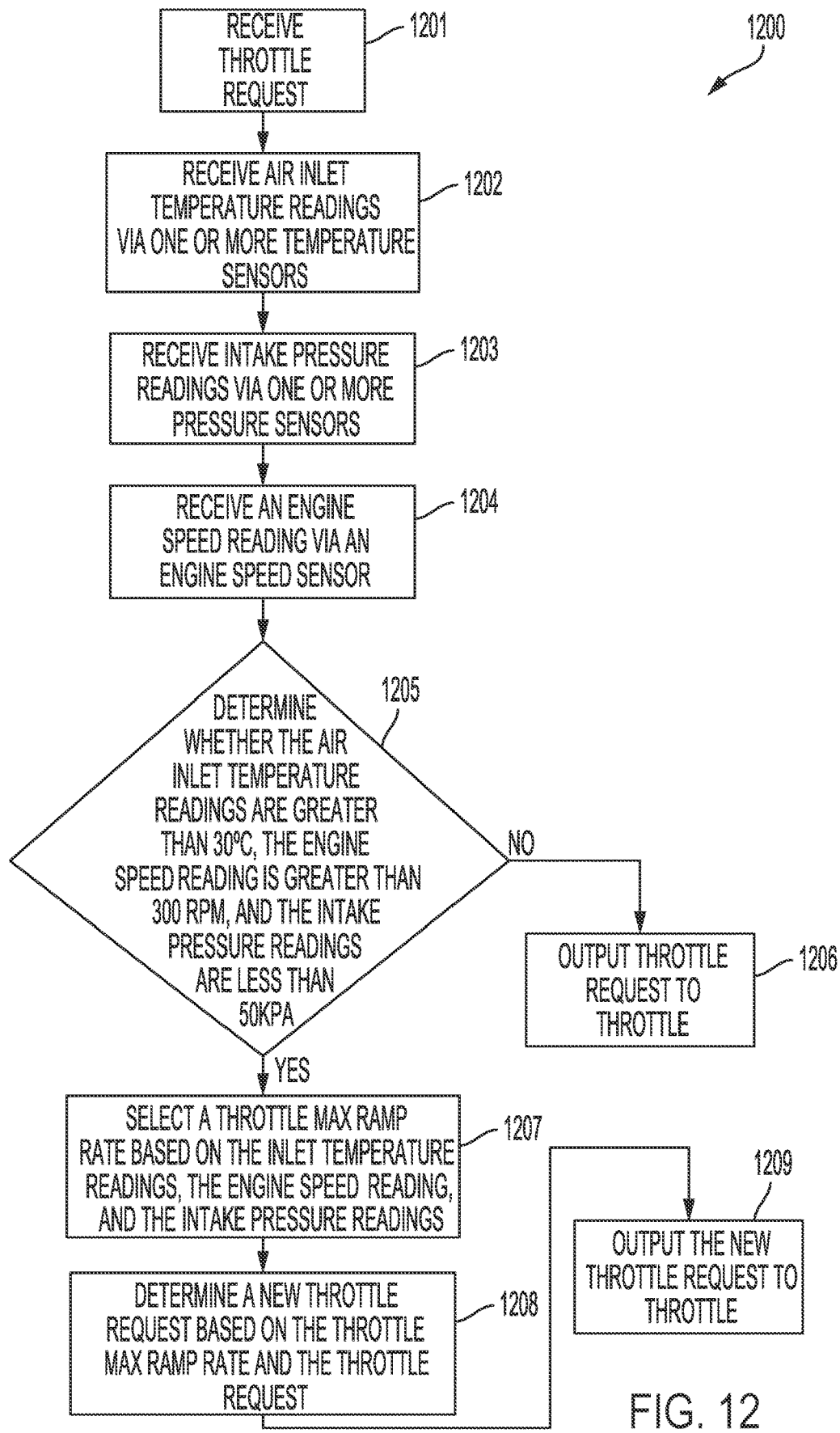
FIG. 12 is a flow diagram of an example process for controlling the throttle response control system of FIG. 1 for controlling a throttle rate of speed of a throttle of the vehicle according to an aspect of the invention.

FIG. 12 is a flow diagram of an example process 1200 for controlling and/or slowing the rate at which the throttle 105 opens. One or more computers or one or more data processing apparatuses, for example, the ECU 102 of the throttle response control system 100 of FIG. 1, appropriately programmed, may implement the process 1200. For ease of description, the process 1200 is described below with reference to FIG. 1. The process 1200 of the present disclosure, however, is not limited to use of the exemplary throttle response control system 100 of FIG. 1.

The throttle response control system may receive a throttle request (1201). A driver of the vehicle 101 may depress the accelerator pedal 111. The accelerator pedal sensor 109e may output a position and/or an angle of the accelerator pedal 111 to the ECU 102. The ECU 102 may receive and/or interpret the position and/or the angle of the accelerator pedal 111 as the throttle request. The throttle request may correspond to a target throttle angle and to a throttle rate of speed.

The throttle response control system 100 may further receive air inlet temperature readings via one or more temperature sensors 109c, 109d (1202). The air inlet temperature readings may be an air temperature in the intake hose 106, an air temperature in the intake manifold 104, and/or the greater of the air temperatures in the intake hose 106 and the intake manifold 104.

The throttle response control system 100 may further receive intake pressure readings via one or more pressure sensors 109a, 109b (1203). The intake pressure readings may be an air pressure in the intake hose 106, an air pressure in the intake manifold 104, and/or the difference between the air pressures in the intake hose 106 and the intake manifold 104.

The throttle response control system 100 may further receive an engine speed reading via the engine speed sensor 109g (1204).

The throttle response control system 100 may determine whether the air inlet temperature readings is/are greater than 30 degrees Celsius (or any other temperature threshold), the engine speed reading is greater than 3,000 RPM (or any other engine speed threshold), and the intake pressure readings is/are less than 50 kilopascals (or any other pressure threshold) (1205). If the answer is no, the throttle response control system 100 may output the throttle request to the throttle 105 such that the throttle 105 may open to the target throttle angle at the throttle rate of speed (1206). If the answer is yes, the throttle response control system 100 may proceed to block 1207.

The throttle response control system 100 may select a throttle maximum ramp rate based on the inlet temperature readings, the engine speed reading, and the intake pressure readings (1207). The throttle maximum ramp rate may be the maximum speed that the throttle 105 may open to the target throttle angle. The ECU 102 may select the throttle maximum ramp rate from a table stored in the memory 108. The ECU 102 may select the value and/or update the value based on the inlet temperature readings. The ECU 102 may determine and/or select the throttle maximum ramp rate by activating a rate limit logic.

The throttle response control system 100 may determine a new throttle request based on the throttle maximum ramp rate and the throttle request (1208). The new throttle request may correspond to the target throttle angle and the throttle maximum ramp rate.

The throttle response control system 100 may output the new throttle request to the throttle 105 and/or control the throttle 105 such that the throttle 105 opens to the target throttle angle at the maximum throttle ramp rate (1209).

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A throttle response control system for a vehicle, comprising:

an intake hose configured to receive air;
a throttle coupled to the intake hose and configured to open and close at a rate of speed and receive the air from the intake hose;
a first temperature sensor coupled to the intake hose and configured to detect an air temperature in the intake hose;
a memory configured to store a temperature threshold; and
an electronic control unit (ECU) coupled to the throttle and configured to:
  determine an intake hose temperature from data from the first temperature sensor;
  determine the intake hose temperature is greater than the temperature threshold indicating the intake hose is at risk of restricting airflow; and
activate a rate limit logic when the intake hose temperature is greater than the temperature threshold to cause the throttle to open at a rate of speed that is inversely proportional to the intake hose temperature.

2. The throttle response control system of claim 1, wherein:
the throttle is further configured to receive a target throttle angle and open to the target throttle angle;
the ECU is further configured to provide the target throttle angle to the throttle; and
the rate limit logic causes the throttle to slow the rate at which the throttle opens to the target throttle angle.

3. The throttle response control system of claim 1, further comprising:
an intake manifold coupled to the throttle, and configured to receive the air from the throttle; and
a first pressure sensor configured to detect an air pressure in the intake manifold, wherein:
  the memory is further configured to store a first pressure threshold,
  the ECU is further configured to receive data from the first pressure sensor and determine an intake pressure, and
  activating the rate limit logic is further based on the intake pressure being less than the first pressure threshold.

4. The throttle response control system of claim 2, further comprising a second temperature sensor coupled to the intake manifold and configured to detect an air temperature in the intake manifold, wherein the intake hose temperature is the greater of the air temperature in the intake hose and the air temperature in the intake manifold.

5. The throttle response control system of claim 3, further comprising a second pressure sensor configured to detect an air pressure in the intake hose, wherein:
the memory is further configured to store a second pressure threshold, and
the ECU is further configured to deactivate the rate limit logic if the air pressure in the intake hose is greater than the second pressure threshold.

6. The throttle response control system of claim 3, further comprising:
an engine coupled to the intake manifold; and
an engine speed sensor configured to detect an engine speed of the engine, wherein:
  the memory is further configured to store an engine speed threshold,
  the ECU is further configured to receive data from the engine speed sensor, and
  activating the rate limit logic is further based on the engine speed of the engine being greater than the engine speed threshold.

7. The throttle response control system of claim 6, wherein opening at the rate of speed that is inversely proportional to the intake hose temperature is further based on the engine speed and the air pressure in the intake manifold.

8. The throttle response control system of claim 6, wherein the temperature threshold, the first pressure threshold, the second pressure threshold, and/or the engine speed threshold are based on a material the intake hose is made of.

9. A throttle control system for a vehicle, comprising:
an intake hose configured to receive air;
a throttle coupled to the intake hose and configured to open and close at a rate of speed and receive the air from the intake hose;
one or more sensors configured to detect an intake air temperature of the vehicle; and
an electronic control unit (ECU) coupled to the throttle and configured to:
  determine a throttle rate limit based on the intake air temperature from the one or more sensors, the throttle rate limit being a limit on the rate of speed at which the throttle opens; and
  control the rate of speed at which the throttle opens based on the throttle rate limit when the intake air temperature is greater than a temperature threshold indicating the intake hose is at risk of restricting airflow.

10. The throttle control system of claim 9, wherein the intake air temperature is an air temperature in the intake hose.

11. The throttle control system of claim 9, further comprising an engine coupled to the throttle, wherein:
the one or more sensors are further configured to detect an engine speed of the engine, and
determining the throttle rate limit is further based on the engine speed of the engine.

12. The throttle control system of claim 11, further comprising an intake manifold coupled to the engine and the throttle, and configured to receive the air from the throttle, wherein:
the one or more sensors are further configured to detect an intake air pressure of the vehicle, and
determining the throttle rate limit is further based on the intake air pressure.

13. The throttle control system of claim 11, further comprising a memory configured to store one or more temperature thresholds, engine speed thresholds, and pressure thresholds, wherein determining the throttle rate limit is further based on the one or more temperature thresholds, the one or more engine speed thresholds, and the one or more pressure thresholds.

14. The throttle control system of claim 12, wherein the intake air temperature is the greater of the air temperature in the intake hose and an air temperature in the intake manifold.

15. The throttle control system of claim 12, wherein the intake air pressure is an air pressure in the intake manifold.

16. The throttle control system of claim 12, wherein the one or more sensors includes a first temperature sensor coupled to the intake hose, a second temperature sensor coupled to the intake manifold, a first pressure sensor coupled to the intake manifold, a second pressure sensor coupled to the intake hose, and an engine speed sensor coupled to the engine.

17. A method for controlling a throttle response of a vehicle having a throttle, the method comprising:
- storing, in a memory, a temperature threshold and a pressure threshold;
- receiving, by an electronic control unit (ECU), an accelerator pedal input via an accelerator pedal sensor, the accelerator pedal input corresponding to a target throttle angle;
- receiving, by the ECU, an intake air temperature of the vehicle via one or more temperature sensors;
- receiving, by the ECU, an intake air pressure of the vehicle via one or more pressure sensors;
- determining the intake air temperature is greater than the temperature threshold indicating an intake hose of the vehicle is at risk of restricting airflow; and
- activating, by the ECU, a rate limit logic when the intake air temperature is greater than the temperature threshold and the intake air pressure is less than the pressure threshold to cause the throttle to open at a rate that is inversely proportional to the intake air temperature.

18. The method of claim 17, further comprising:
- storing, in the memory, an engine speed threshold; and
- receiving, by the ECU, an engine speed reading of the vehicle via an engine speed sensor, wherein activating the rate limit logic is further based on the engine speed of the vehicle being greater than the engine speed threshold.

19. The method of claim 18, wherein the intake air temperature is the greater of an air temperature in an intake hose of the vehicle and an air temperature in an intake manifold of the vehicle.

20. The method of claim 18, wherein the intake air pressure is an air pressure in an intake manifold of the vehicle.

* * * * *